United States Patent [19]

Bland

[11] Patent Number: 4,620,108

[45] Date of Patent: Oct. 28, 1986

[54] MEANS PROVIDING INDEPENDENTLY CONTROLLED SUPERIMPOSED AC AND DC VOLTAGES

[75] Inventor: Robert J. Bland, Berkeley Heights, N.J.

[73] Assignee: Hewlett-Packard Company, Palo Alto, Calif.

[21] Appl. No.: 740,948

[22] Filed: Jun. 4, 1985

[51] Int. Cl.$^4$ ............................................. H02J 5/00
[52] U.S. Cl. ........................................ 307/2; 307/43; 307/72
[58] Field of Search ...................... 307/2, 1, 3, 43, 48, 307/72, 73

[56] References Cited

U.S. PATENT DOCUMENTS

| | | | |
|---|---|---|---|
| 3,047,727 | 7/1962 | McAllise | 307/2 |
| 3,093,783 | 6/1963 | Hass | 307/2 |
| 4,156,150 | 5/1979 | Harrigan et al. | 307/2 |
| 4,170,739 | 10/1979 | Frusztajer et al. | 307/2 |

FOREIGN PATENT DOCUMENTS

| | | | |
|---|---|---|---|
| 0121421 | 7/1983 | Japan | 307/2 |
| 615574 | 6/1978 | U.S.S.R. | 307/2 |

*Primary Examiner*—William M. Shoop, Jr.
*Assistant Examiner*—Sharon D. Logan
*Attorney, Agent, or Firm*—Donald N. Timbie

[57] ABSTRACT

A circuit for combining independently controlled AC and DC voltages in which AC and DC voltages are respectively applied to different inputs of a first amplifier, its output is connected to a first output terminal, the DC voltage is applied to the input of a second amplifier, its output is connected to a second output terminal that is grounded for AC, a voltage divider is connected between said output terminals and the gains of the amplifiers for DC are the same.

2 Claims, 1 Drawing Figure

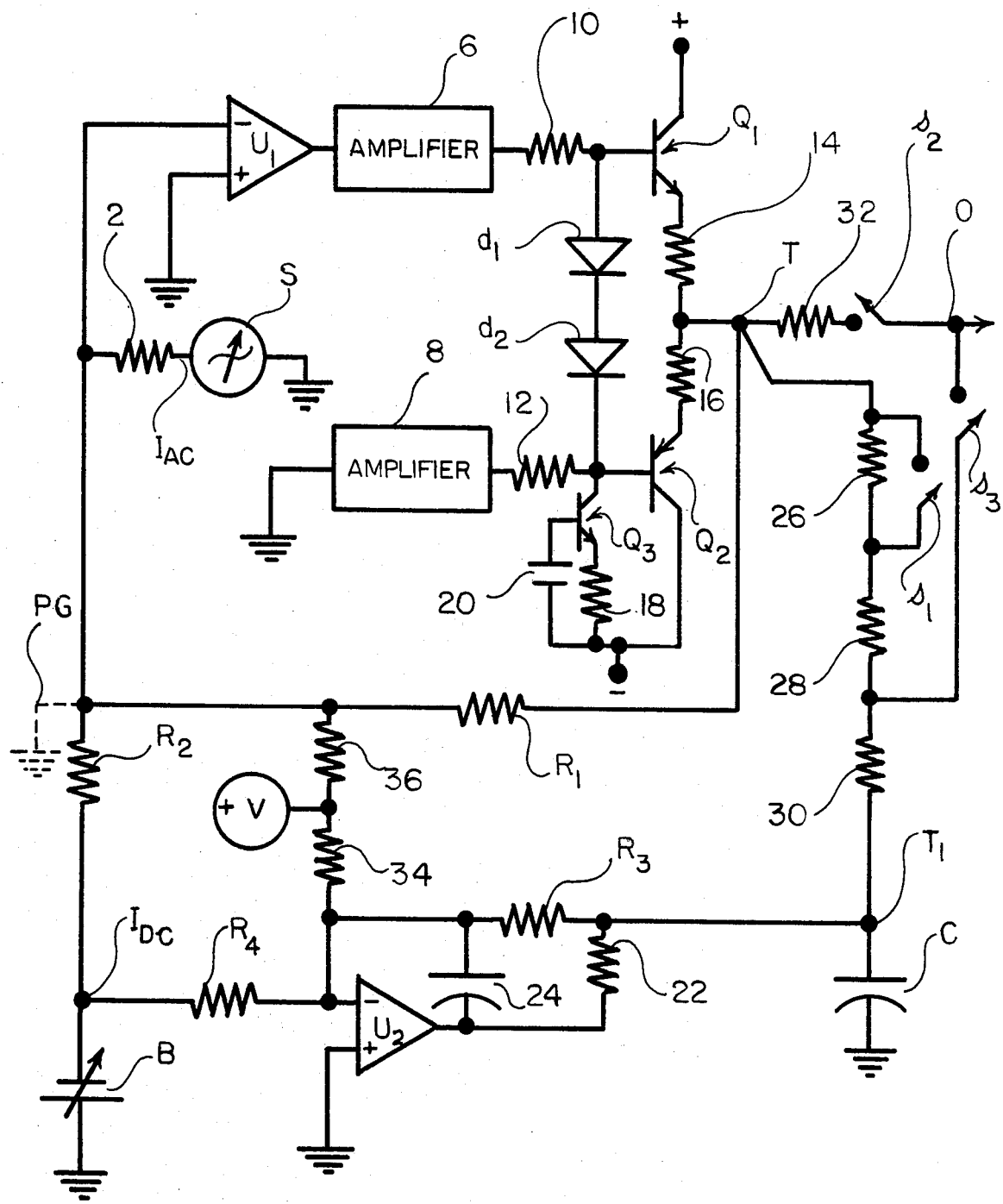

MEANS PROVIDING INDEPENDENTLY CONTROLLED SUPERIMPOSED AC AND DC VOLTAGES

BACKGROUND OF THE INVENTION

In a number of situations independently variable alternating current and direct current voltages are required. A straight forward way of achieving this result is to provide an attenuator between an alternating current (AC) voltage source and one input of an adder, and an attenuator between a direct current (DC) voltage source and another input of the adder. Whereas such a circuit would perform the basic function, the signal-to-noise ratio would not be very good. It has therefore been suggested that the attenuator be connected to the output of the main amplifier. The main amplifier noise is attenuated for small signals, but the DC voltage will also be attenuated so that the AC and DC are not independent.

BRIEF DESCRIPTION OF THE INVENTION

In accordance with the invention, AC and DC voltages are coupled from separate inputs by a first operational amplifier to one terminal of a voltage divider, and a DC voltage alone is coupled to the other terminal of the divider by a second operational amplifier. The latter terminal is grounded for AC by a capacitor and the gains of both amplifiers for DC are the same so that both terminals of the divider are at the same DC voltage. Thus the divider can be controlled so as to vary the amplitude of the AC voltage at its output without affecting the DC voltage, and the desired value of DC voltage can be attained at the output by selecting the proper value of the DC voltage applied to the inputs of the amplifier. The AC voltage is kept out of the DC amplifier circuit by virtue of a phantom ground established by the first amplifier.

DETAILED DESCRIPTION OF THE INVENTION

In the drawing, a source S of alternating current voltage is coupled to an input $I_{AC}$ of an operational amplifier $U_1$. The input $I_{AC}$ is coupled via a resistor 2 to the inverting pin of $U_1$, and the non-inverting pin thereof is connected to ground. The output of the operational amplifier $U_1$ may be coupled to a push-pull amplification means comprised of amplifiers 6 and 8 that are respectively connected via resistors 10 and 12 to the base electrodes of an NPN transistor $Q_1$ and a PNP transistor $Q_2$. The collector of $Q_1$ is connected to a point of positive operating potential, and its emitter is connected via a resistor 14 to an output terminal T. The collector of $Q_2$ is connected to a point of negative operating potential, and its emitter is connected via a resistor 16 to the output terminal T. Diodes $d_1$ and $d_2$ are connected in series, the anode of $d_1$ being connected to the base of $Q_1$ and the cathode of $d_2$ being connected to the base of $Q_2$. The diodes serve the function of removing crossover distortion by reducing the base voltage drive swing required when switching from $Q_1$ to $Q_2$ and back again in push-pull.

The collector of an NPN transistor $Q_3$ is connected to the base of $Q_2$ and the emitter of $Q_3$ is connected via a resistor 18 to the point of negative operating potential. A variable battery 20 is connected between the point of negative operating potential and the base of $Q_3$ so as to keep current flowing therein. A feedback resistor $R_1$ for the operational amplifier $U_1$ is connected between the output terminal T and the inverting pin of $U_1$.

One terminal of a variable battery B is connected to ground and the other is connected to an input terminal $I_{DC}$ of the operational amplifier $U_1$. A resistor $R_2$ is connected between the input terminal and the inverting pin of $U_1$. The amplification of the AC voltage supplied by the source S is determined by the ratio of the values of the resistor $R_1$ to the value of the resistor 2, and the amplification of the DC voltage provided by the battery B to the input terminal $I_{DC}$ is determined by $R_1/R_2$.

Another operational amplifier $U_2$ is provided for amplifying just the DC voltage supplied by the battery B. A resistor 22 is connected between the output electrode of an operational amplifier $U_2$ and a terminal T' that is connected to ground via a capacitor C. A feedback resistor $R_3$ is connected between T' and the inverting pin of $U_2$, and its non-inverting pin is connected to ground. A capacitor 24 is connected between the output pin of $U_2$ and its inverting pin for stability reasons.

The input $I_{DC}$ for the operational amplifier $U_1$ is also an input for the operational amplifier $U_2$ and is connected via a resistor $R_4$ to the inverting pin of $U_2$. Thus the DC voltage gain of $U_2$ is $R_3/R_4$. Since $R_1/R_2$ is made equal to $R_3/R_4$, the DC voltage gain of $U_1$ and $U_2$ are the same, thereby causing the same DC voltage to be applied to the terminals T and T'.

In order to provide different amplitude ranges for the AC voltage, a voltage divider is provided comprising resistors 26, 28 and 30 connected in series between terminals T and T', a switch $s_1$ connected across the resistor 26, a resistor 32 and a switch $s_2$ connected in series between the terminals T and the output O, and a switch $s_3$ connected between the output O and the junction of the resistors 28 and 30. By adjusting the switches $s_1$ through $s_3$, a desired range of AC voltage can be selected and the variability of the source S of AC voltage can be used to adjust the output voltage within each range.

Note, however, that because both terminals T and T' are at the same DC voltage, operation of the switches $s_1$ through $s_3$ has no effect on the DC voltage at the output O. The DC voltage at the output O is selected by adjusting the battery B.

In order that the voltage at the output O for the circuit can be made to vary in a negative direction, a resistor 34 is connected between the inverting pin of the operational amplifier $U_2$ and a positive voltage $+V$; and a resistor 36 having the same value as the resistor 34 is connected between the inverting pin of the operational amplifier $U_1$ and $+V$.

The AC voltages in the circuit of $U_1$ do not find their way into the circuit of $U_2$ because the inverting pin of $U_1$ is kept at a phantom ground indicated by the dotted lines at PG.

What is claimed is:

1. A circuit for providing independently controllable AC and DC voltages comprising,
    a first input terminal to which an AC voltage may be applied,
    a second input terminal to which a DC voltage may be applied,
    a first output terminal, first amplifying means coupled between said first and second input terminals and said first output terminal,
    a second output terminal, a capacitor connected between said second output terminal and a point of reference potential, voltage dividing means coupled between said first and second output terminals, second amplifying means coupled between said second input terminal and said second output terminal, said first and second amplifying means having the same gain for DC voltage.

2. A circuit as set forth in claim 1 wherein said first amplifying means is comprised of, a first operational amplifying device having an inverting input pin, a non-inverting input pin and an output pin, said output pin being coupled to said first output terminal, a first resistor coupled between said output pin and said inverting input pin, a second resistor connected between said inverting input pin and said first input terminal, said second amplifying means is comprised of, a second operational amplifying device having an inverting input pin, a non-inverting input pin and an output pin, said latter output pin being coupled to said second output terminal, a third resistor connected between said latter output pin and said latter inverting input pin, a fourth resistor connected between said latter inverting input pin and said second input terminal, the ratio of the resistances of said first and second resistors being the same as the ratio of the resistances of said third and fourth resistors.

* * * * *